US012249751B2

(12) United States Patent
Fikes et al.

(10) Patent No.: US 12,249,751 B2
(45) Date of Patent: Mar. 11, 2025

(54) SELF-DEPLOYABLE ANTENNA

(71) Applicant: California Institute of Technology, Pasadena, CA (US)

(72) Inventors: Austin C Fikes, Pasadena, CA (US); Oren Mizrahi, Pasadena, CA (US); Fabian Wiesemuller, Zürich (CH); Eleftherios Gdoutos, Pasadena, CA (US); Alan Truong, Rosemead, CA (US); Sergio Pellegrino, Pasadena, CA (US); Seyed Ali Hajimiri, La Cañada, CA (US)

(73) Assignee: California Institute of Technology, Pasadena, CA (US)

( * ) Notice: Subject to any disclaimer, the term of this patent is extended or adjusted under 35 U.S.C. 154(b) by 275 days.

(21) Appl. No.: 17/807,051

(22) Filed: Jun. 15, 2022

(65) Prior Publication Data

US 2022/0399630 A1 Dec. 15, 2022

Related U.S. Application Data

(60) Provisional application No. 63/210,783, filed on Jun. 15, 2021.

(51) Int. Cl.
*H01Q 1/08* (2006.01)
*H01Q 1/38* (2006.01)
(Continued)

(52) U.S. Cl.
CPC ............... *H01Q 1/08* (2013.01); *H01Q 1/085* (2013.01); *H01Q 1/38* (2013.01); *H01Q 1/50* (2013.01);
(Continued)

(58) Field of Classification Search
CPC ............ H01Q 1/08; H01Q 1/085; H01Q 1/38; H01Q 1/50; H01Q 9/16; H01Q 9/285; H01Q 19/30
See application file for complete search history.

(56) References Cited

U.S. PATENT DOCUMENTS

| | | | | |
|---|---|---|---|---|
| 2005/0264448 A1* | 12/2005 | Cox | H01Q 1/085 | 343/700 MS |
| 2006/0208956 A1* | 9/2006 | Surducan | H01Q 21/30 | 343/700 MS |

(Continued)

FOREIGN PATENT DOCUMENTS

| | | | | |
|---|---|---|---|---|
| GB | 2487391 A * | 7/2012 | H01Q 1/085 |
| WO | 2022266637 A1 | 12/2022 | |

OTHER PUBLICATIONS

International Search Report and Written Opinion for International Application No. PCT/US2022/072958, Search completed Oct. 7, 2022, Mailed Oct. 7, 2022, 8 pgs.

(Continued)

*Primary Examiner* — Hoang V Nguyen
*Assistant Examiner* — Yonchan J Kim
(74) *Attorney, Agent, or Firm* — KPPB LLP

(57) ABSTRACT

A self-deployable antenna and/or antenna array that is made up of one or more antenna elements. Each of the antenna elements has a structural base that supports portions of the antenna and can be positioned between a stored configuration for compaction and a deployed configuration for transmitting. The antenna elements and structural base can be part of a base substrate that provides a base support for the antenna and/or antenna array to be compacted and deployed.

21 Claims, 5 Drawing Sheets

(51) Int. Cl.
*H01Q 1/50* (2006.01)
*H01Q 9/16* (2006.01)
*H01Q 9/28* (2006.01)
*H01Q 19/30* (2006.01)

(52) U.S. Cl.
CPC ............... *H01Q 9/16* (2013.01); *H01Q 9/285* (2013.01); *H01Q 19/30* (2013.01)

(56) References Cited

U.S. PATENT DOCUMENTS

| | | | | |
|---|---|---|---|---|
| 2007/0281566 | A1* | 12/2007 | Ohta | B32B 27/12 428/548 |
| 2016/0376037 | A1 | 12/2016 | Pellegrino et al. | |
| 2018/0151938 | A1 | 5/2018 | Rudys et al. | |
| 2019/0237858 | A1 | 8/2019 | Palmer et al. | |
| 2019/0393602 | A1* | 12/2019 | Arya | H01Q 21/0018 |
| 2020/0373673 | A1 | 11/2020 | Hashemi et al. | |

OTHER PUBLICATIONS

Hashemi et al., “A flexible phased array system with low areal mass density”, Nature Electronics, May 17, 2019, vol. 2, pp. 195-205, DOI https://doi.org/10.1038/s41928-019-0247-9.

Hodges et al., “Isara—integrated solar array and reflectarray cubesat deployable ka-band antenna”, IEEE International Symposium on Antennas and Propagation USNC/URSI National Radio Science Meeting, Jul. 2015, pp. 2141-2142, doi: 10.1109/APS.2015.7305460.

Wang et al., “Inflatable antenna for space-borne microwave remote sensing”, IEEE Antennas and Propagation Magazine, Oct. 2012, vol. 54, No. 5, pp. 58-70, doi: 10.1109/MAP.2012.6348118.

International Preliminary Report on Patentability for International Application PCT/US2022/072958, Report issued Dec. 14, 2023, Mailed on Dec. 28, 2023, 04 Pgs.

* cited by examiner

SELF-DEPLOYABLE ANTENNA

CROSS-REFERENCE TO RELATED APPLICATIONS

This application claims priority to U.S. Provisional Patent Application No. 63/210,783 filed on Jun. 15, 2021, the disclosure of which is herein incorporated by reference in its entirety.

FIELD OF THE INVENTION

This application generally refers to antennas and antenna arrays. More specifically, it is related antennas that can be compacted and subsequently self-deploy.

BACKGROUND

Microwave transmission systems have been used in a variety of applications to transmit signals between different locations. No component of a microwave transmission system is more tightly coupled to the geometry than an antenna. Accordingly, this presents numerous challenges in designing lightweight antennas that can be used in applications that would necessarily require a compact and lightweight design such as space-based applications. For example, some space systems require large deployable apertures that can be carried into orbit in a compact volume. Some developments have been made in lightweight deployable structures that can be used in space systems, however many such designs and systems tend to be highly susceptible to manufacturing variations which make them largely incapable of large-scale production.

SUMMARY OF THE INVENTION

In some embodiments, the techniques described herein relate to a self-deployable antenna including: A structural substrate having a first position and a second position, wherein the first position is a generally flat position and the second position is a deployed position that is out of plane from the first position; and A flexible substrate having a network of conductive traces, wherein the flexible substrate is disposed on and interconnected with at least a portion of the structural substrate such that the flexible substrate can be moved between the first position and the deployed position, and wherein the network of conductive traces are configured to receive and transmit a signal when in the deployed position.

In some embodiments, the techniques described herein relate to a self-deployable antenna, wherein the network of conductive traces forms a dipole antenna.

In some embodiments, the techniques described herein relate to a self-deployable antenna, wherein the network of conductive traces forms a Yagi-Uda antenna configuration.

In some embodiments, the techniques described herein relate to a self-deployable antenna, wherein the structural substrate is included of multiple layers of a composite material impregnated with an uncured resin.

In some embodiments, the techniques described herein relate to a self-deployable antenna, wherein the composite material is a glass fiber.

In some embodiments, the techniques described herein relate to a self-deployable antenna, wherein the glass fiber is a 1067 glass fiber.

In some embodiments, the techniques described herein relate to a self-deployable antenna, wherein the uncured resin is a Patz-F4 resin.

In some embodiments, the techniques described herein relate to a self-deployable antenna, wherein the composite material is a carbon fiber.

In some embodiments, the techniques described herein relate to a self-deployable antenna, wherein the multiple layers of composite material is three layers of material that have a fiber orientation of 45°/90°/45°.

In some embodiments, the techniques described herein relate to a self-deployable antenna, wherein the structural substrate is included of a shape memory alloy.

In some embodiments, the techniques described herein relate to a self-deployable antenna, wherein the flexible substrate is a polyimide substrate.

In some embodiments, the techniques described herein relate to a self-deployable antenna, wherein the conductive traces are selected from a group consisting of copper, gold, silver, aluminum, and carbon.

In some embodiments, the techniques described herein relate to a self-deployable antenna, wherein the conductive traces are arranged in a finger overlap pattern on a first and second side of the flexible substrate.

In some embodiments, the techniques described herein relate to a self-deployable antenna, wherein the flexible substrate is bonded to the structural substrate through a co-curing process.

In some embodiments, the techniques described herein relate to a self-deployable antenna, wherein the co-curing process includes obtaining a curable substrate; obtaining a flexible substrate; aligning the curable substrate with the flexible substrate in a flat configuration; forming the aligned substrates into a molded shape using a predefined mold; and co-curing the curable substrate and the flexible substrate in a curing device.

In some embodiments, the techniques described herein relate to a self-deployable antenna, wherein the curing device is an autoclave.

In other embodiments, the techniques described herein relate to an array of self-deployable antennas including: At least a first and a second antenna including, A structural substrate having a first position and a second position, wherein the first position is a generally flat position and the second position is a deployed position that is out of plane from the first position; A flexible substrate having a network of conductive traces, wherein the flexible substrate is disposed on and interconnected with at least a portion of the structural substrate such that the flexible substrate can be moved between the first position and the deployed position, and wherein the network of conductive traces are configured to receive and transmit a signal when in the deployed position.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Turning now to the drawings, systems and methods for self-deployable antennas and antenna arrays that can be compacted into a small form factor and are light weight. Many embodiments include a sheet of material containing a predefined conductive path that forms the electronic path of the signal for an antenna. The sheet of material is connected to a structural substrate material that can then be co-cured and formed into the desired deployed state of the antenna and/or antenna array.

Lightweight antennas that can unroll, unfold, or inflate to a functional physical configuration are emerging in a variety of applications. Since the antenna is a key element to any microwave transmission system, it is important that such antennas be adaptable to the particular use. Some areas of development have been in the space industry because of the extensive use of such antennas in transmitting signals. However, the development of such antennas that can be compactible and light weight and self-deploying has not yielded any device capable of large-scale manufacturing. Additionally, many systems require external deployment mechanisms to help position the antenna into a deployed state. Furthermore, when flexible antennas are subsequently connected to a deployment mechanism, the mechanical connection between the two components tends to create unwanted stresses and potential issues with deployment and ultimately the function of the antenna. This can be especially true when bonding a flexible antenna to any sort of structural element. The bond needs to withstand the stresses of bending and folding for compaction and such bonds tend to require additional adhesives and/or bonding components that do not possess the same mechanical properties of the flexible antenna or the deployment mechanism. Accordingly, many designs are subject to failure due to mis bonds or separation of components.

In contrast, many embodiments are directed to antennas and antenna arrays that can be light weight, foldable, and self-deployable such that then the antenna or antenna array is unfolded or unrolled it will automatically deploy into it's deployed position. Having an antenna in a deployed vs flat position can be advantageous because of the ability for the antenna to better direct the transmission, such as in steerable transmission beams.

Figure 1A:
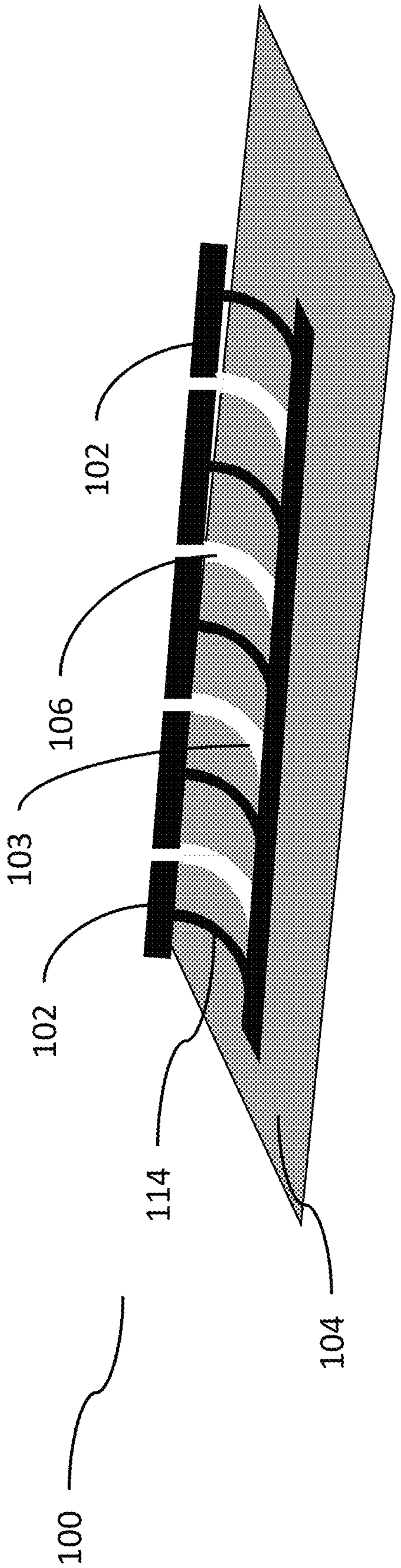
FIGS. 1A and 1B conceptually illustrate a self-deployable antenna in accordance with embodiments FIG. 2 conceptually illustrates a self-deployable antenna array in accordance with embodiments, FIG. 3A through 3C conceptually illustrates a transmission line configuration in accordance with embodiments.
Figure 1B:
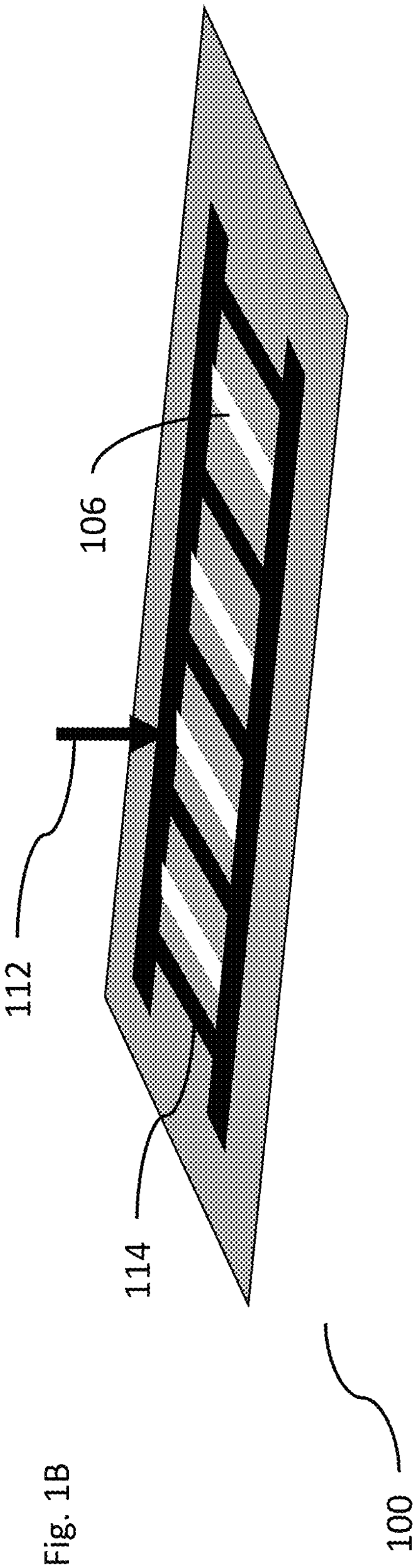

FIGS. 1A and 1B, as an example, illustrate a self-deployable antenna or antenna array 100 with multiple dipole antenna elements 102. Each of the antenna elements 102 have a resilient body 103 that is connected to a base substrate 104. The resilient body 103 is capable of supporting the antenna elements 102 in order to position them into a deployed configuration (1A). It can be appreciated that the flexible or semi-flexible nature of the base substrate 104 and the resilient nature of the body 103 can allow for the antenna elements 102 to be rolled and/or folded into a compacted state for use in small form factors such as satellites and then deployed into a transmission capable configuration. In many embodiments, one or more structural components 106 can be interconnected with the antenna elements 102 and form the support necessary to transition the antenna elements 102 from a stored configuration (1B) to a deployed configuration (1A). In the deployed configuration the antennal elements 102 can sit out of plane with the plane of the base substrate 104. Additionally, the structural components 106 can provide some flexibility to allow for the antenna 100 to be compacted.

The compaction of the antenna elements 102 can be initiated by a holding force 112 generated on the antenna elements. This can be representative of the rolling or folding or compaction of the array in the process of compacting the base substrate 104. Likewise, when the force is removed through the process of unfolding or unrolling, the structural components 106 and resilient body 103 will naturally want to extend into their predetermined shape in order to deploy the antenna elements. This is due to the resilient nature of the body of the structural components.

In accordance with many embodiments, the structural components 106 can take on any number of shapes and/or configurations. For example, some may have a "J" shape structure. Others can be "T" shaped or any other suitable shape. Ultimately, they are designed to help deploy the antenna elements 102 into the deployed state as well as provide the support necessary for the antenna to maintain the desired shape. Additionally, the structural elements 106 help to ensure that the electrical transmission lines 114 remain intact and undamaged. This is a critical function since damaged lines can inhibit the overall functionality of the antenna and prevent the transmission of signals to and from the antenna. As can be appreciated, the transmission lines can extend onto the substrate where they can be connected to additional electronic connections (not shown) such as circuit boards or other components that may be required to fully operate the antenna and/or antenna array.

Figure 2:
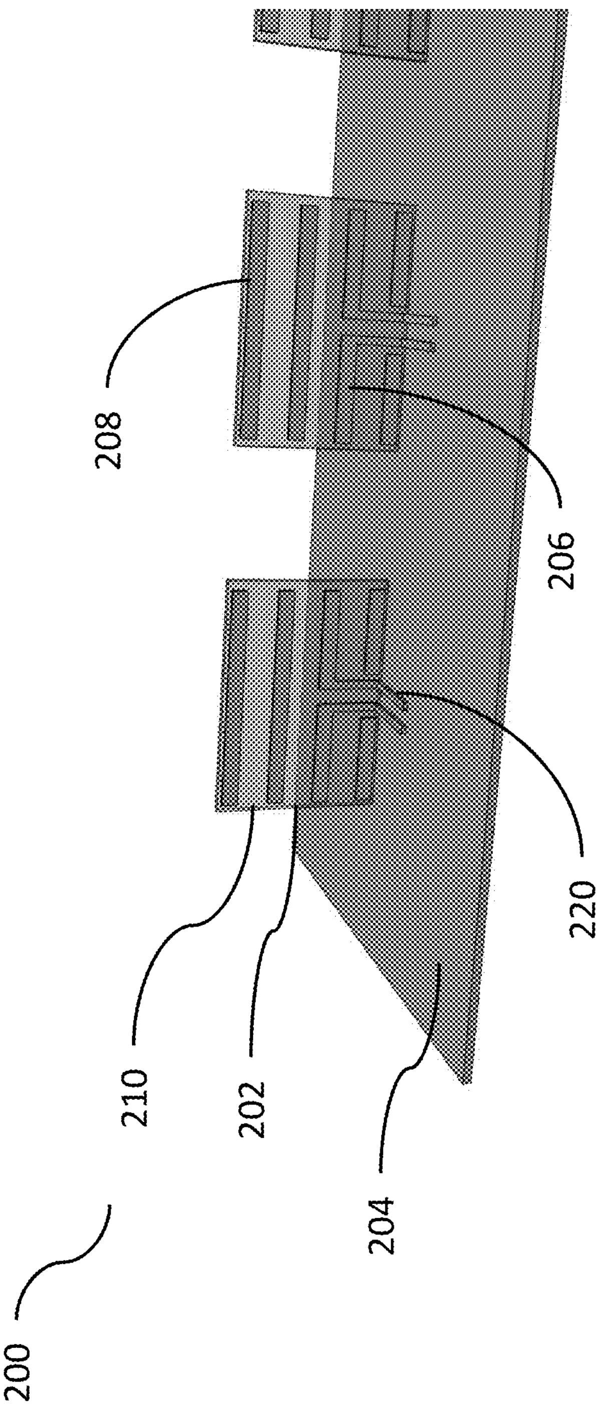

Although FIGS. 1A and 1B, illustrate one possible configuration of an antenna and/or antenna array, it can be appreciated that the antenna configuration can vary depending on the type and desired function of the antenna. For example, FIG. 2 illustrates an embodiment of a self-deployable antenna/antenna array 200 with multiple antennal elements 202 disposed on top of a base substrate 204. The antenna elements 202 are representative of a yagi-uda style antenna with a pair of driven arms 206 and multiple director/reflectors 208 to create a directional beam. In order to allow the antenna elements 202 to self-deploy, each element can have a structural substrate 210 that is bonded to each of the portions of the antenna element 202. In some embodiments, the structural substrate 210 can be connected to the base substrate 204 by any number of means that would allow the feed transmission lines 220 to be connected to the antenna elements 202 and keep the electrical connection that may be necessary for proper function. Additionally, many embodiments of the antenna elements 202 can have flexible or semi-flexible structural substrates 210 that can allow for the antenna element 202 to lay flat and be rolled in a compacted configuration. Once the overall structure 200 is unrolled or unfolded, the resilient nature of the flexible and/or semi-flexible structural substrate 210 will allow the antenna element 202 to self-deploy into a configuration that would allow for accurate and steerable transmissions.

Embodiments of Transmission Lines

The importance of transmission lines can sometimes be overlooked when developing a functional and flexible self-deployable antenna and/or antenna array. Transmission lines help to ensure the proper connections can be made and that the antennas are capable of functioning properly. For example, in some embodiments, the transmission line must be capable of accomplishing a single-ended to differential conversion and impedance transformation between the line and the antenna elements. In some embodiments, the impedance may be near 500. The impedance can vary depending on the overall size, configuration, and transmission requirements of the particular antenna. In some embodiments, transmission lines 304 and 306 can be disposed on either side of a substrate 302 as illustrated in FIG. 3A. The substrate 302 can be a base substrate or a structural substrate of the antenna element. In some embodiments the transmission lines can be positioned such that their respective edges overlap as shown in FIG. 3A. Some embodiments of transmission lines 304 and 306 can have finger lines 308 and 310 that extend from the main transmission lines 304 and 306 and overlap in a finger overlap configuration as illustrated in FIG. 3B.

Figure 3B:
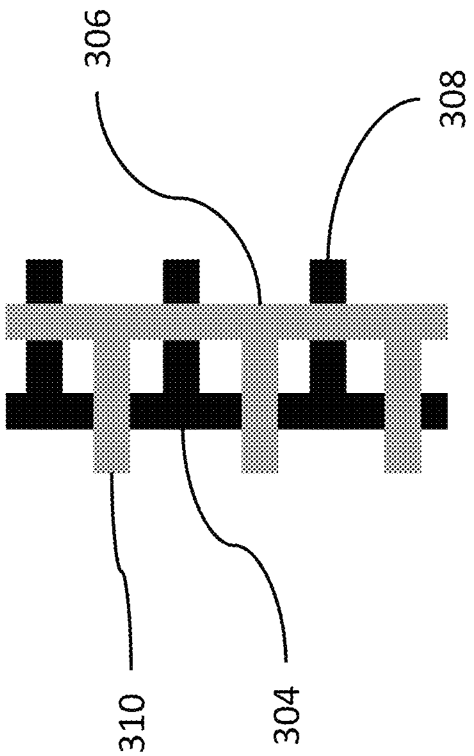
Figure 3C:
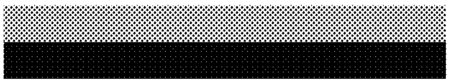
Figure 3A:
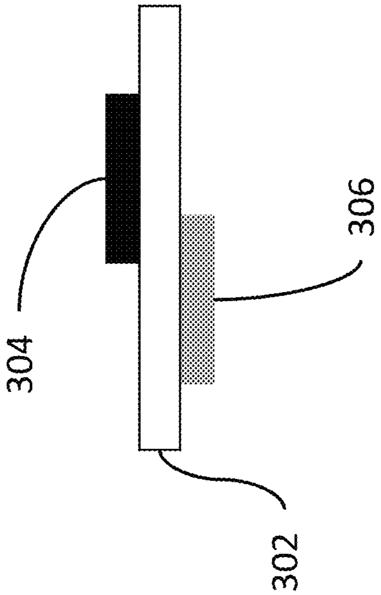
Figure 4:
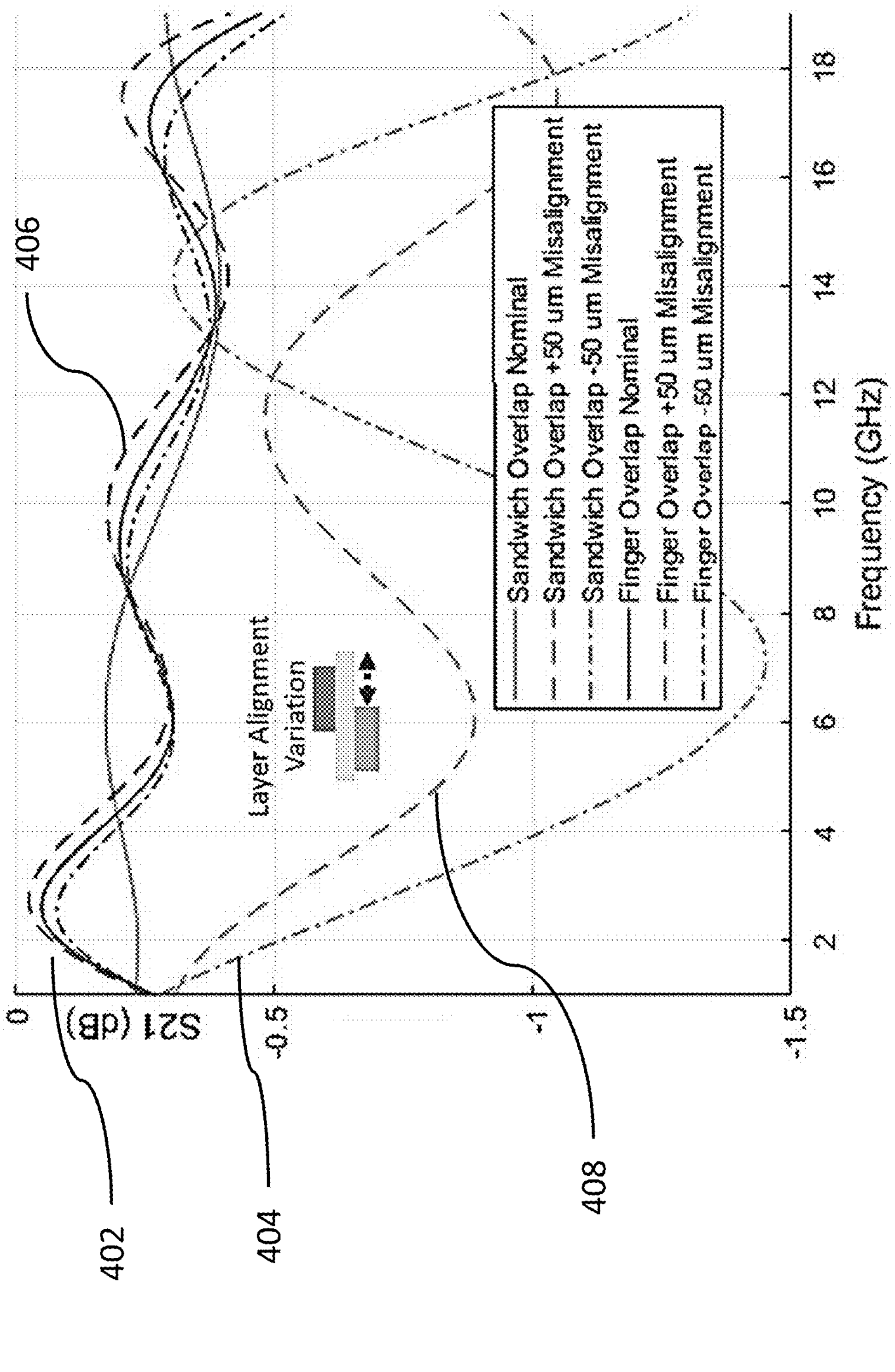
FIG. 4 is a graphical illustration of the effectiveness of a transmission line configuration.

The finger overlap configuration illustrated in FIG. 3B can be superior to a more traditional sandwich overlap configuration shown in FIG. 3C due to the improved performance of such design. For example, FIG. 4 graphically illustrates the more consistent response of a finger overlap configuration 402 as compared to the sandwich overlap response 404. As can be seen, there is much less variation in the finger overlap response 402. This is especially true when you take into consideration a 50 μm misalignment in both designs. The finger overlap with a 50 μm misalignment 406 produces a more consistent response than that of the sandwich design with the 50 μm misalignment 408.

Embodiments of Substrates

The collapsibility and self-deployable structure of the overall transmission system can be largely dependent on the type of substrates used in the various antenna elements and base structures. In some embodiments the base substrates can be made of a polyimide sheet. This can allow for the flexibility that is needed for the collapsible and self-deployable designs in many embodiments. As can be appreciated, the base structures can be a conductive structure. By conductive it is meant that the substrate can have separate layers of conductive or contain conductive traces that allow for the transmission of electrical signals. The traces can be of any shape or configuration depending on the type of antenna and the overall transmission requirements. The traces can be preformed throughout the substrate forming a network of traces. Additionally, the traces or conductive material can be made of any suitable conductive material such as copper, gold, silver, titanium, aluminum, carbon, etc.

The structural supports of the antenna elements can be made from any number of materials that can provide some rigidity yet allow for a resilient and flexible design to self-deploy the antenna elements. For example, some embodiments of the structural substrate can be made from a glass fiber composite. This can be made into a structure that provides the ultimate shape of the antenna element such as a frame or other support structure. Other embodiments of the structural substrate can be from carbon fiber composites or a resiliently flexible metal. Some embodiments may have one or more layers of composite material. For example, some embodiments of the glass and/or carbon fiber can have 3 layers of material with a fiber orientation of 45°/90°/45°. Some fibers may be a 1067 glass fiber. Additionally, various embodiments of the glass and/or carbon fiber can be pre-impregnated with resin that would need to be cured to a solid state. In some embodiments the resin may be a Patz-F4 resin. Although specific fibers and/or resins are mentioned, it should be understood that any suitable fiber and/or resin combination may be used for the substrates.

In some embodiments, the structural substrate can be a shape memory alloy. Shape memory alloys can be configured to have a "memorized" shape by a variety of forming processes, such as high heat application while being held in the desired shape. The alloy memorizes the desired shape and then when cooled or not activated it can be deformed into any shape. The alloy can then be activated through heat or an electrical current and it will go back to the memorized shape.

Embodiments of the Forming Process

As can be appreciated, antennas and/or antenna elements can require a variety of different shapes in order to meet the certain functional capabilities of the transmission system. This can pose a potential issue for applications that require compatibility, because the compaction can introduce stresses to the materials that can can result in delamination or damage to the components upon deployment. As discussed previously, traditional methods have included the bonding of components after the manufacturing of them. This often requires the use of bonding materials such as tapes or adhesives that can have different material properties, such as a different Coefficient of Thermal Expansion, than the antenna elements or structural elements of the system. This can sometimes cause the unwanted separations of components during the folding and unfolding processes.

Figure 5:
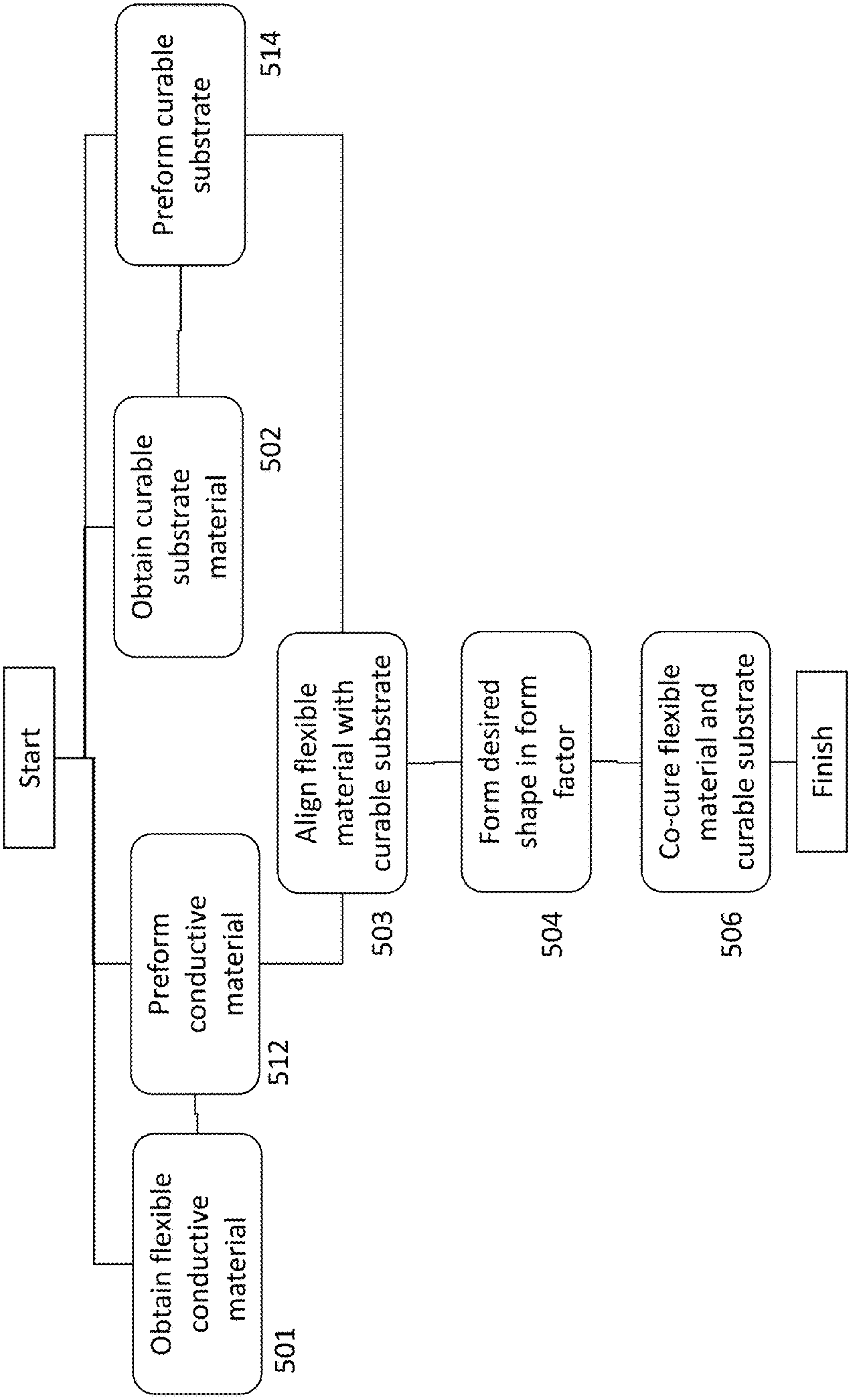
FIG. 5 illustrates a process flow diagram of manufacturing a self-deployable antenna in accordance with embodiments.

In contrast, many embodiments incorporate a co-curing process between the structural support substrates and the base substrates. As previously discussed, the base substrates can be a polyimide circuit sheet for producing the electrical transmission components and the structural substrate can be a variety of materials, including glass fiber and resin composites. Some embodiments can implement a co-curing process of the two substrate materials to create the self-deployable antenna and/or antenna array. As illustrated in FIG. 5, the self-deployable antenna and/or antenna array can be formed by taking a base conductive substrate (501) and a curable substrate (502) and aligning the two materials together (503). The two sheets of material can then be placed into a shaped mold (504) or form factor. The shaped mold or form factor can be premade to take on the desired end shape of the deployed antenna elements. Additionally, the mold can be made of any suitable material such as metal and silicone. Once secured in the mold (504) the sheets can be co-cured (506). The co-curing process can be done in an autoclave or other device suitable for curing the materials. This can include any device that can also apply vacuum to the part during the cure process to help with the bonding procedure. The process of co-curing can be highly advantageous over traditional bonding methods, because the resin in the uncured material will bond with and cure with the conductive sheet of material in a single process. This eliminates the need to align materials after they have been shaped and eliminates the need to additional adhesive materials. Additionally, the alignment problem is solved with the material be held in alignment in the mold during the curing process.

This co-curing process is highly scalable for the mass production of deployable antennas and/or antenna arrays because the sheets of the conductive material can be preformed or premanufactured (512) to the desired antenna configuration. Likewise, the curable substrate can be preformed (514) in the desired shape and layering configuration to produce the self-deployed antenna and/or antenna array. It can be appreciated, that the co-curing process can be used to configure the structural elements and antenna elements into any suitable shape that may be useful for the overall function of the antenna and/or antenna array. Accordingly, the molds can be of any suitable shape to match the desired end shape of the antennas.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims

What is claimed is:

1. A self-deployable antenna comprising:

a flexible base substrate having a network of conductive traces, wherein a portion of the network of conductive traces is arranged in an overlap pattern on a first side and a second side of the flexible base substrate and formed into a plurality of transmission lines, wherein the overlap pattern on the first side and the second side are configured with a set misalignment, wherein the plurality of transmission lines are connected to a plurality of receptive and transmission elements, and wherein the flexible base substrate is compactible between a compacted configuration and a deployed configuration such that in the deployed configuration the flexible base substrate is flat; and a structural substrate having a resilient body with a first end and a second end, where the first end is connected to the flexible base substrate, wherein a portion of the flexible base substrate containing a portion of the network of conductive traces is connected to a portion of the resilient body and wherein the structural substrate is deployable between the compacted configuration and the deployed configuration, wherein in the compacted configuration the resilient body of the structural substrate is positioned parallel to a plane of the flexible base substrate, and wherein in the deployed configuration the resilient body of the structural substrate is positioned out of plane from the plane of the flexible base substrate, wherein the resilient body of the structural substrate is placed under stress through application of a holding force when in the compacted configuration such that when in the deployed configuration the holding force is removed and the resilient body of the structural substrate self-articulates to the deployed configuration; and wherein the portion of the network of conductive traces is configured to send and receive a signal.

2. The self-deployable antenna of claim 1, wherein the plurality of receptive and transmission elements form a dipole antenna.

3. The self-deployable antenna of claim 1, wherein the plurality of receptive and transmission elements form a yagi-uda antenna configuration.

4. The self-deployable antenna of claim 1, wherein the structural substrate is comprised of multiple layers of a composite material impregnated with a resin.

5. The self-deployable antenna of claim 4, wherein the composite material is a glass fiber.

6. The self-deployable antenna of claim 5, wherein the glass fiber is a 1067 glass fiber.

7. The self-deployable antenna of claim 4, wherein the resin is a Patz-F4 resin.

8. The self-deployable antenna of claim 4, wherein the composite material is a carbon fiber.

9. The self-deployable antenna of claim 4, wherein the multiple layers of the composite material is three layers of material that have a fiber orientation of 45°/90°/45°.

10. The self-deployable antenna of claim 1, wherein the flexible base substrate is a polyimide substrate.

11. The self-deployable antenna of claim 1, wherein the conductive traces are selected from a group consisting of copper, gold, silver, aluminum, and carbon.

12. The self-deployable antenna of claim 1, wherein the flexible base substrate is bonded to the structural substrate through a co-curing process.

13. The self-deployable antenna of claim 12, wherein the co-curing process comprises:

obtaining a curable substrate;

obtaining a flexible substrate;

aligning the curable substrate with the flexible substrate in a flat configuration;

forming the curable substrate and the flexible substrate into a molded shape using a predefined mold; and co-curing the curable substrate and the flexible substrate in a curing device.

14. The self-deployable antenna of claim 13, wherein the curing device is an autoclave.

15. The self-deployable antenna of claim 1, wherein the set misalignment is configured for a consistent response.

16. The self-deployable antenna of claim 15, wherein the plurality of transmission lines have an impedance of 50 Ω.

17. The self-deployable antenna of claim 1, wherein the set misalignment is 50 μm.

18. An array of self-deployable antennas comprising: at least a first and a second antenna comprising, a flexible base substrate having a network of conductive traces, wherein a portion of the network of conductive traces is arranged in a finger overlap pattern on a first and second side of the flexible base substrate and formed into a plurality of transmission lines, wherein the finger overlap pattern on the first side and the second side are configured with a set misalignment, wherein the plurality of transmission lines are connected to a plurality of receptive and transmission elements, and wherein the flexible base substrate is compactible between a compacted configuration and a deployed configuration such that in the deployed configuration the flexible base substrate is flat; and a structural substrate having a resilient body with a first end and a second end, where the first end is connected to the flexible base substrate, wherein a portion of the flexible base substrate containing a portion of the network of conductive traces is connected to a portion of the resilient body and wherein the structural substrate is deployable between the compacted configuration and the deployed configuration, wherein in the compacted configuration the resilient body of the structural substrate is positioned parallel to a plane of the flexible base substrate, and wherein in the deployed configuration the resilient body of the structural substrate is positioned out of plane from the plane of the flexible base substrate, wherein the resilient body of the structural substrate is placed under stress through application of a holding force when in the compacted configuration such that when in the deployed configuration the holding force is removed and the resilient body of the structural substrate self-articulates to the deployed configuration; and wherein the portion of the network of conductive traces is configured to send and receive a signal.

19. The array of self-deployable antennas of claim 18, wherein the set misalignment is configured for a consistent response.

20. The array of self-deployable antennas of claim 19, wherein the plurality of transmission lines have an impedance of 50 Ω.

21. The array of self-deployable antennas of claim 18, wherein the set misalignment is 50 μm.

* * * * *